United States Patent Office 3,378,836
Patented Apr. 16, 1968

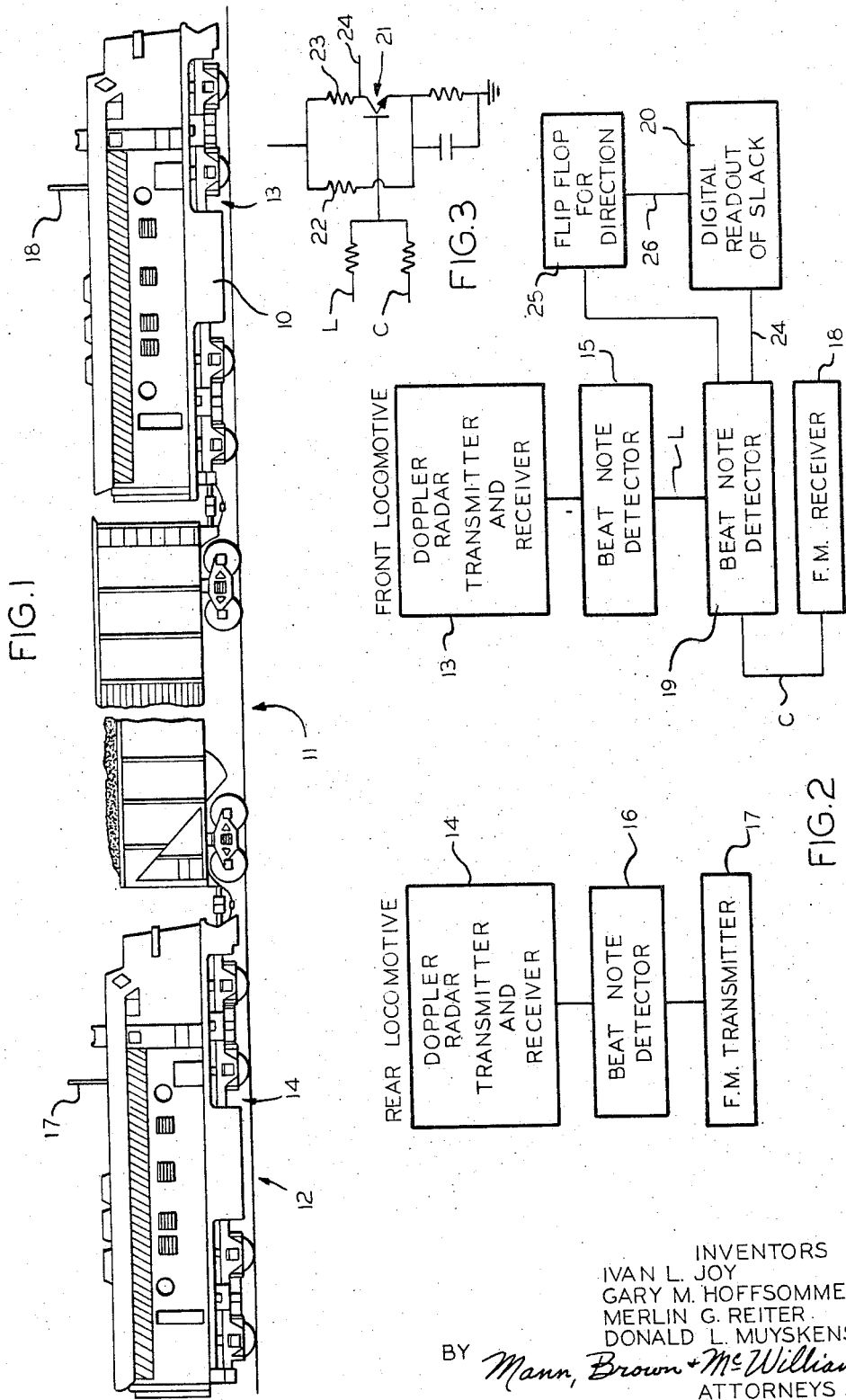

3,378,836
TRAIN SLACK MEASURING APPARATUS
Ivan L. Joy, 1616 W. 29th St. 66611; Gary M. Hoffsommer, R.F.D. 4 66603; Merlin G. Reiter, 5408 W. 24th St. 66614; and Donald L. Muyskens, 245 E. 29th St. 66611, all of Topeka, Kans.
Filed Aug. 29, 1966, Ser. No. 575,595
3 Claims. (Cl. 343—6)

ABSTRACT OF THE DISCLOSURE

A system for measuring accumulated slack in a railway train which has Doppler radar for independently measuring the speeds of front and rear cars in a train, and comparing system for converting Doppler radar signals indicative of speed into a readout of accumulated slack in the train.

---

The present invention is directed to improvements for measuring the slack condition of railroad trains and is directed to improvements which can provide an indication of the rate of slack change as well as the accumulated slack condition in a railroad train.

Modern trains may be as much as one mile long and in a train of such length, the slack accumulated between all of the various cars of the train in the couplings therefor may amount to as much as thirty feet or so. The slack condition may vary as the train moves over the right-of-way due to the rear of the train tending to move faster than the front of the train and vice versa. If slack is either taken up too fast due to the relative movement or if slack moves out too fast, severe impact stresses may be set up in the cars of the train with attendant possible damage to the lading being transported. Similarly, impact stresses set up may result in broken drawbars of the train. For this reason, it has been proposed to provide some means for measuring the relative speeds of the front and rear of the train so as to give the engineer an indication of the slack condition. For example, in copending application Ser. No. 433,114, now Patent No. 3,273,145, which was filed in the names of Ivan L. Joy and James W. Luehring, it has been proposed to utilize Doppler radar to measure the train length from the engine to the caboose or to a helper locomotive. This system measures the speed of the locomotive relative to the caboose and will give a proper indication of the slack condition as long as the train is being operated on a straight portion of track. However, when the train operates around a curve, the system provides an erroneous measure of the slack condition because the radar speed measuring apparatus operates on a straight line from the caboose to the locomotive, whereas the actual length of the train is longer than the straight line between the caboose and the locomotive.

The principal purpose of the present invention, therefore, is to provide improvements in train slack measuring apparatus which give an accurate reading of the slack condition of the train regardless of whether the train is operating on a straight section of track or a curved section of track and to so arrange the system that it provides a simple and economical means of indicating the total slack condition existing at any one time as well as providing an indication of the rate of change of the slack condition, these and other purposes being more apparent in the course of the ensuing specification and claims when taken with the accompanying drawings, in which:

FIGURE 1 is a diagrammatic illustration of a typical train provided with slack measuring and indicating apparatus operating in accordance with the principles of the present invention;

FIGURE 2 is a diagrammatic view of a slack measuring system incorporating the principles of the present invention; and FIGURE 3 is a diagrammatic illustration of a circuit used to compare frequencies which are representative of speeds and to actuate a digital read-out of the slack condition.

Like elements are designated by like characters throughout the specification and drawings.

With particular reference now to the drawings and in the first instance to FIGURE 1 the numeral 10 generally designates a locomotive pulling a series of cars represented generally at 11. A helper locomotive 12 is shown at the end of the train. It should be understood that the showing of the helper locomotive in FIGURE 1 is intended to be representative of either a helper locomotive at the rear portion of a train, the caboose, or some other car positioned at the rearward end of the train.

The locomotive or engine 10 carries a radar speed measuring system diagrammatically represented at 13 while the rear locomotive or car carries a similar radar speed measuring apparatus 14. These radar speed measuring apparatuses 13 and 14 are of the type known to the art as Doppler radar transmitters and receivers. They generate radio frequency signals which may be on the order of 4,680 megacycles and the echoes or reflections coming back from posts, trees or other items passed by the train provide an audio signal which indicates the speed the vehicle is traveling. This is done by means of a beat-note detector which is associated with each of the radar transmitter and receivers as indicated at 15 and 16 in the drawings. For example, at a speed of 30 miles per hour and a frequency of 4800 megacycles, each beat-note detector will generate an audio signal of 400 cycles per second.

The Doppler radar transmitter and receiving equipment may, for example, consist of a klystron oscillator connected to a transmitting horn, while the receiving antenna is another horn connected to a crystal detector that has its output connected to an ordinary audioamplifier. The beat-note detector in each case receives part of the signal from the transmitter and also receives a signal resulting from the echoes from the trees, posts, ties, and various other irregularities along the roadbed.

Thus, the speed of the front of the train and the speed of the rear of the train is measured continuously and the audio signals generated in both the front and rear beat-note detectors are a direct indication of the speeds at which the front and rear portions of the train are traveling at any time.

The system includes a means for comparing these indicated speeds in order to provide an indication of relative speed and an indication of slack. For example, when the locomotive in front is traveling faster than the rear of the train, the comparing means provides an indication of slack being paid out. The comparing means also provides an indication of a situation where slack is being taken up, as for example, when the rear of the train is traveling faster than the front of the train.

The beat-note detector 16 at the rear of the train is connected to an FM radio transmitter 17 so that the audio signal provided by the beat-note detector 16 is broadcast or communicated to the front of the train where an FM radio receiver 18 receives the signal. The electrical signal received by the FM receiver 18 is supplied to the detector 19 which also receives the audio signal from beat-note detector 15. Beat-note detector 19 is made to detect beat-notes in an extremely low audio range and has an output connected to a digital read-out or counter 20 which is responsive to pulses supplied from the beat-note detector 19. As long as the frequencies supplied to beat-note detector 19 by beat-note detector 15 and the FM receiver 15 are equal, the beat-note detector transmits nothing to the digital read-out. Beat-note detector 19 is made so that it will provide one beat note every time the difference in the signals supplied to it vary to the extent that the speed difference between the front and rear portion of the train has resulted in a change in distance of one-tenth of a foot. For example, if the difference in speed is one mile per hour, this represents a change in the slack condition of 1.47 feet per second and beat-note detector 19 will then supply approximately 15 beat notes or pulses to the digital read-out. The speed of the beat notes generated by the beat-note detector 19 indicates the speed of slack run-in or slack run-out and the number of beat notes that accumulate in a given amount of time represent the total amount of slack that is run in or out on the train in that amount of time. The digital read-out may be calibrated to count pulses or beat-notes received by it and to convert the same into a counter type reading of the accumulated slack condition. For example, the counter may be set to add up successive one-tenth of a foot changes in the slack condition. The digital read-out may also include an indicator which is responsive to the speed of the pulses received so as to provide a direct indication of the relative rate of slack run-in or slack run-out.

The beat-note detector 19 is so arranged as to provide pulses upon noting differences in the frequencies supplied to it so as to actuate the digital read-out in either an additive or subtractive relation indicating slack run-out or slack run-in, respectively.

As an example of the foregoing, the beat-note detector 19 may include a circuit as diagrammatically represented in FIGURE 3 for the purpose of supplying a pulse to the digital read-out 20 every time that the frequencies indicative of the speed of the locomotive and caboose change by one wave length. For example, in FIGURE 3 the signals in the form of alternating current frequencies from the locomotive and the helper locomotive or caboose are represented as being supplied through the lines designated L and C. These signals are supplied to the base of a transistor generally designated at 21. The transistor 21 is biased off a resistor 22 and a resistor 23 so that its emitter is at approximately 10 volts above current. The collector of the transistor is connected through line 24 to the digital counter or read-out 20. This circuit is arranged so that when the wave forms of the signals from the locomotive and caboose or helper locomotive are in phase, the transistor 21 is driven to saturation which causes the collector to create a pulse or an output signal through line 24 to the digital read-out. On the other hand, when the wave forms supplied through lines L and C are out of phase the voltage supplied to the base of the transistor is lower and insufficient to create a pulse through line 24. In such an event, no pulse is provided until the wave forms again move into phase. Thus, when the frequencies of the signals supplied through lines L and C are different, the wave forms move into and out of phase with one another and cause a pulse through line 24 for each cycle of phase difference. The digital read-out is calibrated to show a $\frac{1}{10}$ foot change in accumulated slack condition for each pulse supplied through line 24.

In order to determine whether a slack run-in condition or a slack run-out condition is present, a flip flop circuit as generally designated at 25 is provided. This flip flop circuit may take any one of several known forms and is arranged so as to determine the relative progression of the wave forms and to supply an input through line 26 to the digital read-out or counter which will cause actuation of the counter to run in either an additive or subtractive direction. The flip flop circuit may, for example, be arranged to supply one signal to the digital read-out when the locomotive is running faster than the caboose (a slack run-out condition) and a signal of a different order when the caboose is running faster than the locomotive which indicates a slack run-in condition. The flip flop circuit may be arranged so that it is reset following termination of the pulse signal through line 24 so that the digital counter may either work in an additive or subtractive direction following each difference in frequencies of one cycle which in turn is represented by a $\frac{1}{10}$ foot increment on the counter.

Whereas we have shown an operative form of the invention, it should be understood that this showing and description thereof should be taken in an illustrative or diagrammatic sense only. There are many modifications in and to the invention which will fall within the scope and spirit thereof and which will be apparent to those skilled in the art. The scope of the invention should be limited only by the scope of the hereinafter appended claims.

We claim:

1. A system for measuring the slack condition between a forward car and a rearward car in a train including radar means carried by a forward car in a train for measuring the speed of the forward car independently of the rotating speed of the wheels of the forward car, radar means carried by a rearward car of said train for measuring the speed of said rearward car independently of the rotating speed of the wheels of the rearward car, each said radar means including means for providing a variable frequency signal of the same type which varies with and is indicative of the speed measured, means for comparing the frequencies of the signals provided by each radar means, and means operated by said comparing means for correlating differences in said signals resulting from different speeds of said cars and resultant changes in the slack of said train with an indication of the slack condition.

2. The system of claim 1 wherein said comparing means and correlating means is carried by said forward car and said forward car and rearward car have signal receiving and signal broadcasting means for transmitting the variable frequency signal of the rearward car to the forward car.

3. The system of claim 1 wherein said comparing means and correlating means is carried by one of said cars and said cars have signal receiving and signal broadcasting means for transmitting the variable frequency signal from the one car to said other car.

References Cited

UNITED STATES PATENTS

| 1,747,041 | 2/1930 | Alexanderson | 246—187 |
| 3,273,145 | 9/1966 | Joy et al. | 343—8 X |

RODNEY D. BENNETT, *Primary Examiner.*

C. L. WHITMAN, *Assistant Examiner.*